United States Patent [19]
Siewert et al.

[11] Patent Number: 5,837,969
[45] Date of Patent: Nov. 17, 1998

[54] METHOD FOR WELDING CRYOGENIC ALLOYS

[75] Inventors: Thomas A. Siewert; Christopher N. McCowan, both of Boulder, Colo.

[73] Assignee: The United States of America as represented by the Secretary of Commerce, Washington, D.C.

[21] Appl. No.: 531,254

[22] Filed: Sep. 20, 1995

Related U.S. Application Data

[62] Division of Ser. No. 86,531, Jul. 1, 1993, Pat. No. 5,474,737.

[51] Int. Cl.$^6$ ............................. B23K 9/16; B23K 9/00
[52] U.S. Cl. ............................ 219/137 WM; 219/74; 219/137.2; 219/146.23; 219/137.9
[58] Field of Search .................... 219/74, 137.2, 219/137 WM, 146.23, 137.9

[56] References Cited

U.S. PATENT DOCUMENTS 3,644,697  2/1972  Krahl ........................... 219/74
3,740,525  6/1973  Baumel ........................ 219/137

*Primary Examiner*—Deborah Yee
*Attorney, Agent, or Firm*—Leydig, Voit & Mayer Ltd.

[57] ABSTRACT

An alloy comprising nickel, chromium, molybdenum, manganese, nitrogen and iron in amounts such that a weld metal formed therefrom is austenitic, wherein nitrogen is present in a concentration of from about 0.1 to about 0.2% of the alloy in weight percent. The weld metals prepared from the alloys of the present invention possess superior properties as compared to other stainless steels. These properties include inter alia a superior tearing modulus, fracture toughness, and yield strength, even at cryogenic temperatures.

The present invention further provides a method for welding a metal part which is intended for exposure to cryogenic temperatures comprising welding the metal part using a welding electrode comprising nickel, chromium, molybdenum, manganese, nitrogen and iron in amounts such that a weld metal formed therefrom is austenitic, wherein nitrogen is present in the electrode in a concentration of from about 0.1 to about 0.2% of the electrode in weight percent. Preferably, the welding comprises gas metal arc welding, wherein shielding gas used during welding contains no more than about 2% oxygen by volume.

21 Claims, 4 Drawing Sheets

METHOD FOR WELDING CRYOGENIC ALLOYS

This is a divisional of application Ser. No. 08/086,531, filed on Jul. 1, 1993, now U.S. Pat. No. 5,474,737.

FIELD OF THE INVENTION

The present invention relates generally to metal alloys. More specifically, the invention relates to alloys that are useful as welding electrodes and, more particularly, electrodes which are able to form weld metals which are able to withstand exposure to cryogenic temperatures.

BACKGROUND OF THE INVENTION

Over the last few years, research into superconducting magnets has progressed to the level where application of this technology is becoming a practical reality. As superconducting magnets typically must operate at cryogenic temperatures, e.g., down to about 77K and as low as 4K, enclosures and devices used in the various applications of such magnets must necessarily also be able to withstand those extreme temperatures without failing. One example of such a material that has been used to prepare enclosures for one such application, e.g., coil cases for superconducting magnets, is stainless steel.

In the past, stainless steel alloys were formulated and developed so as to maximize their performance at high temperatures. This was primarily due to such alloys' known superior resistance to oxidation at those high temperatures as well as a lack of knowledge as to any applications for such alloys at cryogenic temperatures, e.g., superconducting magnet applications. Examples of such stainless steel alloys which are said to provide the aforesaid high temperature performance include those described in U.S. Pat. Nos. 2,696,433 and 2,839,391.

With the increasing interest in superconducting magnet applications, the evaluation of the properties of various stainless steel alloys at cryogenic temperatures has been undertaken with greater frequency. During such evaluations, it was found that at cryogenic temperatures, weld metals formed from stainless steel electrodes typically possessed a toughness which is significantly lower than that of the corresponding base metal alloy. Therefore, during the past fifteen years, certain studies have been undertaken in an effort to focus upon improving the physical properties of stainless steel welding metals, prepared from welding electrodes, in general at cryogenic temperatures.

One such study evaluated three welding electrodes (which will also be referred to herein as alloys) after they had been formed into a weld metal. This study determined that a ferrite-free 18Cr-16Ni-9Mn-0.14N electrode, when formed into a weld metal, exhibited the best combination of toughness (20 ft-lb Charpy V-notch (CVN) absorbed energy) and strength (124 KSI, 0.2% yield) at 77K. The particular electrode which resulted in the preparation of a weld metal possessing the highest degree of toughness (28 ft-lb CVN) had a composition which can be generally described as 14Cr-20Ni-9Mn-0.08N (91 KSI, 0.2% yield) at 77K. Fickett et al., *Materials Studies for Magnetic Fusion Energy Applications at Low Temperatures-I*, NBSIR 78-884 (April, 1978), pp. 173 & 174.

A second study evaluated three alloys and determined that the electrode from which a weld metal having the highest CVN (46 ft-lb) at 77K was prepared was an alloy comprised of 18Cr-16Ni-9Mn-0.08N (135 KSI, 2% yield strength). The yield strengths of three additional weld metals were evaluated at 4K, with an alloy comprising 18Cr-14Ni-2Mo-0.07N providing a weld metal having the greatest strength (132 KSI) at 4K, while exhibiting a toughness of 52 ft-lb CVN (after annealing) at 77K. Fickett et al., *Materials Studies for Magnetic Fusion Energy Applications at Low Temperatures-II*, NBSIR 79-1609 (June 1979). Despite these advances however, neither of these studies offer any indication as to how the toughness and strength of weld metals prepared from stainless steel alloys could be improved, particularly if a weld metal prepared from such alloys was intended to be exposed to temperatures as low as 4K.

Thus, and despite the availability of the aforesaid known alloys from which weld metals can be prepared, there remains a need for an alloy which, when formed into an electrode, enables one to prepare a welded stainless steel structure, wherein the weld metal formed from the electrode possesses a strength and toughness superior to that of existing weld metals, even when exposed to cryogenic temperatures, e.g., 77K and as low as 4K.

The present invention provides such an improved alloy. These and other advantages of the present invention, as well as additional inventive features, will be apparent from the description of the invention provided herein.

SUMMARY OF THE INVENTION

The present invention provides an austenitic alloy comprising nickel, chromium, molybdenum, manganese, nitrogen and iron in amounts such that a weld metal formed therefrom is austenitic, wherein nitrogen is present in the alloy in a concentration of from about 0.1% to about 0.2% of the alloy in weight percent.

Most preferably, the austenitic alloy comprises nickel at a concentration of about 25%, chromium at a concentration of about 21%, molybdenum at a concentration of about 5%, manganese at a concentration of about 7%, copper at a concentration of about 1.6%, nitrogen at a concentration of about 0.19%, phosphorus and sulfur which, in combination, are present in the alloy at a concentration of less than about 0.015%, oxygen at a concentration of less than about 0.01%, and the balance iron, all in weight percentages.

The weld metal prepared using the alloy of the present invention possesses superior properties, upon exposure to cryogenic temperatures, as compared to known stainless steel alloys. These properties of the weld metal include inter alia a superior tearing modulus, fracture toughness, and yield strength.

The present invention further provides a method which comprises welding a metal part, which part is intended for exposure to cryogenic temperatures, comprising welding the metal part using a welding electrode which provides an austenitic weld metal, the electrode comprising nickel, chromium, molybdenum, manganese, nitrogen and iron in amounts such that a weld metal formed therefrom is austenitic, wherein nitrogen is present in a concentration of from about 0.1 to about 0.2% of the alloy in weight percent. Preferably, the welding comprises gas metal arc welding, wherein the shielding gas used during the welding contains no more than about 2% oxygen by volume.

DETAILED DESCRIPTION OF THE PREFERRED EMBODIMENTS

The invention may best be understood with reference to the accompanying drawings and in the following detailed description of the preferred embodiment.

The present invention provides a novel stainless steel alloy which, when configured into a welding electrode and welded so as to form a weld metal, provides a weld metal having advantageous properties in the areas of strength and toughness even when exposed to cryogenic temperatures. This alloy is a stainless steel which comprises nickel, chromium, molybdenum, manganese, nitrogen and iron in amounts such that a weld metal formed therefrom is austenitic, wherein nitrogen is present in a concentration of from about 0.1% to about 0.2% of the alloy in weight percent. For purposes of describing the present invention, and unless otherwise noted, all percentages should be construed as referring to weight percentages.

Figure 1:
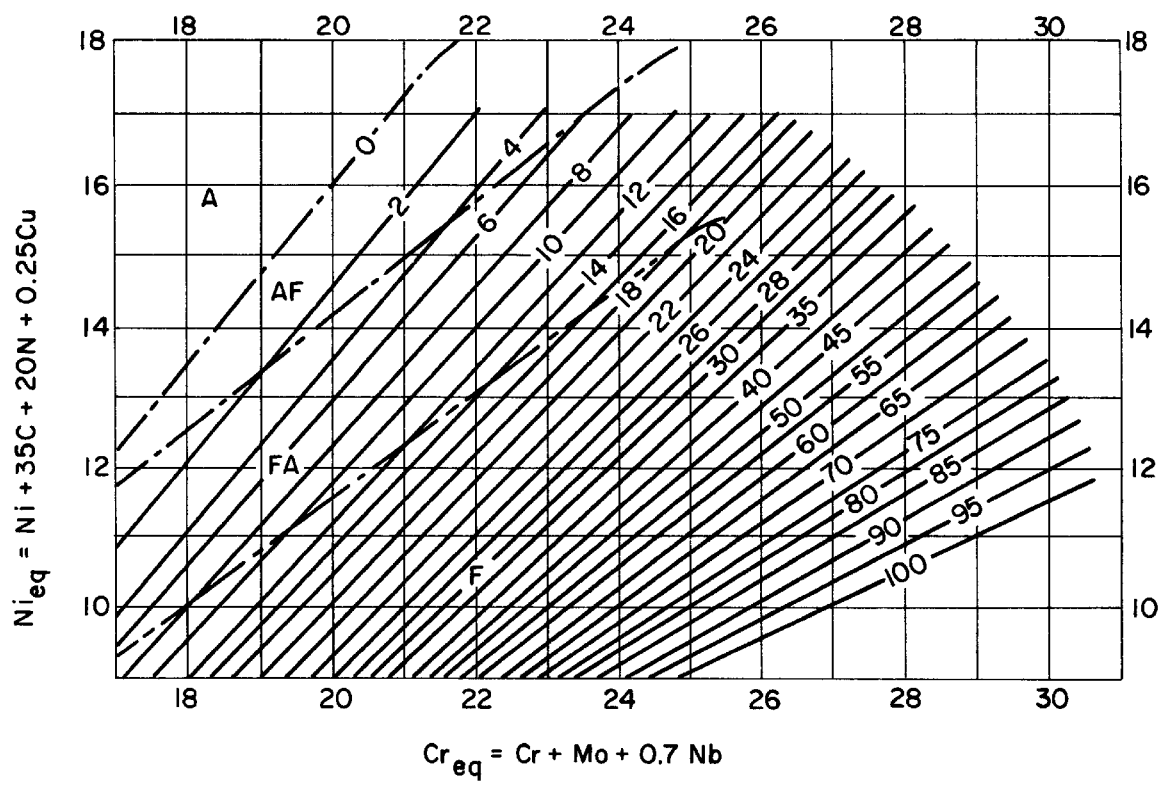
FIG. 1 is a constitution diagram for stainless steel alloys and weld metals used for determining the ferrite content of such metals.

As mentioned above, the stainless steel weld metals of the present invention are austenitic in nature, i.e., no other phase structures are present therein. The existence of such phases in a weld metal, or alloy if desired, e.g., an electrode, can be readily determined by reference to FIG. 1. The weld metal of the present invention falls within the austenitic only section of that figure, that section being denoted by the letter "A". A description of the proper use of that figure is described in Kotecki et al., *Welding Research Supplement*, (May, 1992), pp. 171-s to 178-s.

One of the objects of the present invention is to provide an alloy which, when formed into a weld metal during a welding procedure, provides a weld metal which possesses a relatively high level of strength and toughness at cryogenic temperatures. In pursuing this objective, it was found that by including nickel in the alloy in certain amounts that an increase in weld metal toughness at cryogenic temperatures was experienced. In order to achieve the aforesaid performance, it was discovered that nickel should advantageously be present in the alloy at a concentration of at least about 12% of the alloy, advantageously from about 12% to about 50%, preferably from about 20% to 30%, and most preferably about 25%.

It was further discovered that, when the oxygen content of the weld metal was controlled below a certain limit, a weld metal having superior toughness resulted. The oxygen in the weld metal is present in the form of oxide inclusions, which are the nucleation sites for the fracture of the weld metal. As the number of inclusions is reduced by reducing the oxygen content (assuming the size distribution remains approximately constant), these inclusions become further apart, requiring the nucleation cracks to travel a greater distance before joining, thus providing a weld metal with a high degree of toughness. In particular, the oxygen content of the weld metal in accordance with the present invention is advantageously less than about 0.06% (600 parts per million) in the weld metal (including the oxygen present in the electrode, e.g., preferably about 0.01% and any oxygen provided by the shielding gas used during welding, e.g., about 0.05%). Preferably, the oxygen content in the weld metal will be less than about 0.03%. Lower percentages of oxygen are preferably used to provide weld metals having greater toughness. To achieve such oxygen levels in the weld metal, the oxygen content in the electrode used to form the weld metal is advantageously kept below about 0.03%, and preferably below about 0.01%.

Many prior art alloys designed to provide a weld metal having an austenitic phase will typically further include at least a small amount of a ferrite phase for the purpose of controlling cracking sensitivity during solidification. Ferrite is measured in units of FN, which is approximately equal to volume percent at small numbers. In contrast to the aforementioned weld metals, the weld metal and alloy of the present invention should contain no ferrite as ferrite has lower toughness than austenite at cryogenic temperatures.

In order to provide adequate cracking resistance during solidification in the weld metal of the present invention, it was discovered that such resistance could be controlled within acceptable limits by carefully controlling the phosphorus and sulfur content of the weld metal. In particular, the total phosphorus and sulfur content of the alloy from which the weld metal is prepared, in combination, should be advantageously limited to less than about 0.015% of the alloy. When this is accomplished, the resulting weld metal will also meet the aforesaid limits of sulfur and phosphorus content.

It was further discovered that when one included manganese in the alloy at a concentration of at least about 3% of the alloy, one would advantageously experience greater nitrogen solubility in the weld pool, higher strength in the resulting weld metal, and desulfurization of the weld pool. In view of this, manganese is advantageously present in the alloy from about 3% to about 15%, preferably from about 5% to about 10%, and most preferably about 7%.

In addition to the components identified previously, copper is a further component which may be included in the alloy of the present invention. Specifically, it was discovered that the combination of molybdenum and copper will increase the strength and will have a positive impact upon the cracking resistance of the weld metal during solidification. Preferably then, molybdenum is present in the alloy at a concentration of about 3% to about 10%, and copper is present in the alloy at a concentration of about 1% to about 2%. Most preferably, those two components are present in concentrations of about 5% and about 1.6%, respectively.

Advantageously then, the alloy of the present invention should include nickel at a concentration ranging from about 12% to about 50%, manganese in an amount greater than about 3%, and the remaining alloy components in concentrations such that the weld metal prepared therefrom possesses a tearing modulus of less than about 50, a fracture toughness of at least about 150 MPa/m, and a yield strength of at least about 900 MPa at 4K.

In order to achieve the aforesaid performance level at cryogenic temperatures, the alloy of the present invention advantageously comprises nickel at a concentration of from about 12% to about 50%, -chromium at a concentration of from about 12% to about 30%, molybdenum at a concentration of from about 3% to about 10%, manganese at a concentration of from about 3% to about 15%, and nitrogen at a concentration of about 0.1% to about 0.3%.

Preferably, the alloy of the present invention comprises nickel at a concentration ranging from about 20% to about 30%, chromium at a concentration of about 15% to about 25%, molybdenum at a concentration of about 3% to about 8%, manganese at a concentration of about 5% to about 10%, copper at a concentration of about 1% to about 2%, and nitrogen at a concentration of about 0.15% to about 0.25%.

Most preferably, the alloy of the present invention comprises nickel at a concentration of about 25%, chromium at a concentration of about 21%, molybdenum at a concentration of about 5%, manganese at a concentration of about 7%, copper at a concentration of about 1.6%, nitrogen at a concentration of about 0.19%, and phosphorus and sulfur which, in combination, are limited to less than about 0.015% of the alloy.

As methods of preparing the alloys of the present invention are well known to those of ordinary skill in the art, such methods are not described herein. However, as it has been discovered that the method of welding will effect the resulting weld metal oxygen and nitrogen content, such will be discussed herein.

The present invention further provides a method for using the alloys of the present invention. Advantageously, there is provided a method for welding a metal part wherein the welded part is intended for exposure to cryogenic temperatures. The method comprises welding a metal part using a welding electrode which provides a weld metal, wherein the electrode comprises an alloy of the present invention, as described previously. Preferably, the welding comprises gas metal arc welding, wherein the shielding gas contains no more than about 2% oxygen by volume. Such low levels of oxygen have been found to provide further increases in the fracture toughness of the weld metal. This is due to the discovery that the inclusion volume fraction of the weld metal was lowered, increasing at least its toughness, when the oxygen level in the weld metal was lowered. Thus, in the case of the weld metal, the amount of oxygen used in the shielding gas should be limited such that the oxygen content in the resulting weld metal is less than about 0.06% and preferably less than about 0.04%.

In addition to oxygen, nitrogen may also be added to the weld pool during welding through its presence in the shielding gas. The amount of nitrogen in the alloy, as well as weld metal however should be controlled within certain limits. Although higher levels of toughness are experienced with higher levels of nitrogen in the weld metal, such must be balanced against the introduction of unwanted porosity in the weld metal which results at higher nitrogen levels. Porosity in the weld metal is a property that results from nitrogen's relatively higher solubility in liquid metals, e.g., when the electrode is liquid during welding (the weld pool), as opposed to its solubility when the weld metal solidifies. Specifically, if there is an excess of nitrogen in the weld pool, as the weld pool solidifies and forms the weld metal, the nitrogen, because of its lower solubility in solidified metal, will form air bubbles in the metal. Such air bubbles introduce defects into the weld metal, thereby decreasing its physical and mechanical properties. Therefore, the aforementioned controls must be placed upon the amount of nitrogen in the alloy and weld metal in order to maximize the physical and mechanical properties of the weld metal.

The following example further illustrates the present invention but, of course, should not be construed as in any way limiting its scope.

EXAMPLE

Two 1.2 mm diameter, gas metal arc electrode welding rods were prepared using conventional processing known to those of skill in the art. The composition of those rods, which were fully austenitic in nature, is provided in Table 1.

TABLE 1

| Element | Wire No. 1 | Wire No. 2 |
|---------|-----------|-----------|
| Cr | 19.40 | 21.36 |
| Ni | 24.24 | 25.16 |
| Mo | 4.17 | 5.16 |
| Mn | 1.76 | 7.22 |
| N | 0.056 | 0.190 |
| C | 0.01 | 0.01 |
| Si | 0.29 | 0.39 |
| P | 0.008 | 0.005 |
| S | 0.001 | 0.002 |
| Co | 0.045 | — |
| Cu | 1.46 | 1.61 |

The most preferred alloy of the present invention, which can be used to prepare a weld metal, is a variation of a commercial composition known as 904L when in base plate form and as 385 when in electrode form. Such are available from various sources, including Sandvik of Scranton, Pa. Such commercial compositions are represented by wire no. 1 as described in Table 1.

Two weld series were prepared, using wire no. 1 for Series I and wire no. 2 for Series II. Within each series, systematic variations in the weld metal oxygen content (which can also be expressed as inclusion volume fraction) were achieved by varying the oxygen content of the shielding gas. For those welds, the heat input was kept fairly constant at 2.5 kJ/mm in order to obtain a relatively equal inclusion size distribution. To obtain differences in the inclusion size distribution at a given volume fraction, one weld within each series was deposited at a higher heat input of 4.2 kJ/mm.

All welds were deposited to single V-grooves on type 304 base plates, 25 mm thick, and the groove geometry was as specified in American Welding Society Standard A 5.5–81 (AWS, Miami, Fla. (1981)). The electrode extension was 19 mm and the interpass temperatures were 150° C. Table 2 contains operational conditions for the two weld series.

TABLE 2

| Series | Weld | Current (A) | Voltage (V) | Travel Speed (mm/s) | Heat Input (kJ/mm) | Shield Gas (16.5 l/m) |
|--------|------|------|------|------|------|------|
| I | 1 | 210 | 31 | 2.8 | 2.5 | Ar + 5% $N_2$ |
|   | 2 | 245 | 31 | 3.0 | 2.5 | Ar + 5% $N_2$ + 2% $O_2$ |
|   | 3 | 255 | 29 | 3.0 | 2.5 | Ar + 5% $N_2$ + 5% $O_2$ |
|   | 4 | 250 | 29 | 2.9 | 2.9 | Ar + 5% $N_2$ + 10% $O_2$ |
|   | 5 | 320 | 33 | 2.5 | 4.2 | Ar + 5% $N_2$ + 2% $O_2$ |
| II | 6 | 270 | 31 | 3.4 | 2.5 | Ar + Ar/10% $N_2$ |
|   | 7 | 280 | 31 | 3.5 | 2.5 | Ar |
|   | 8 | 280 | 30 | 3.4 | 2.5 | Ar + 0.5% $O_2$ |
|   | 9 | 270 | 31 | 3.4 | 2.5 | Ar + 2% $O_2$ |
|   | 10 | 290 | 28 | 3.3 | 2.5 | Ar + 5% $O_2$ |
|   | 11 | 390 | 32 | 3.0 | 4.2 | Ar + 2% $O_2$ |

Weld no. 6 utilized a dual-gas-shield configuration as described in McCowan et al., *Advances in Cryogenic Engineering-Materials*, 36 (Plenum Press 1990), p. 1331.

After the welds were completed, for each weld, one all weld metal uniaxial tensile specimen (6.25 mm diameter, 25.4 mm gauge length) and two through-thickness compact tension specimens (CTS) were machined for testing in liquid helium (4K). The CTS were tested in accordance with ASTM Standard E 813-89, using the single-specimen compliance method, while the tensile specimens were strained at a constant cross-head speed of 0.5 mm/min.

For metallographic testing purposes, they were sectioned transverse to the welding direction and subsequently prepared using standard grinding and polishing techniques for metallographic examination. The two-dimensional (2-D) inclusion volume fraction and size distribution were determined by scanning electron microscopy in combination with an automatic image analysis at a magnification of 2500X, using ordinary polished specimens. A total of 500 particles were counted in each instance. In these measurements, due care was taken to ensure that all particles present immediately beneath the metal surface were discriminated through proper adjustment of the microscope operating parameters. Kluken et al., *Material Science Technology*, 4 (1988), p. 648. Following inclusion analysis, the samples were etched with a mix acid (15 ml HCl, 15 ml lactic acid, and 3 ml $HNO_3$) and the average grain size was determined in a light microscope by means of the mean linear intercept technique. ASTM Standard No. E112-84 (1984). In addition, a selected number of broken CTS's were examined to reveal the fracture mode.

The weld metal oxygen and nitrogen contents are given in Table 3, in weight percentages.

TABLE 3

| Weld No. | Oxygen | Nitrogen |
|---|---|---|
| 1 | 0.0102 | 0.165 |
| 2 | 0.0567 | 0.158 |
| 3 | 0.1274 | 0.140 |
| 4 | 0.0928 | 0.115 |
| 5 | 0.0568 | 0.128 |
| 6 | 0.0095 | 0.150 |
| 7 | 0.0121 | 0.149 |
| 8 | 0.0231 | 0.158 |
| 9 | 0.0463 | 0.134 |
| 10 | 0.0589 | 0.144 |
| 11 | 0.0379 | 0.147 |

Measured values for the inclusion volume fraction are provided in Table 4. The inclusion volume fractions reflect the differences in the oxygen content of the weld metal.

Figure 2:
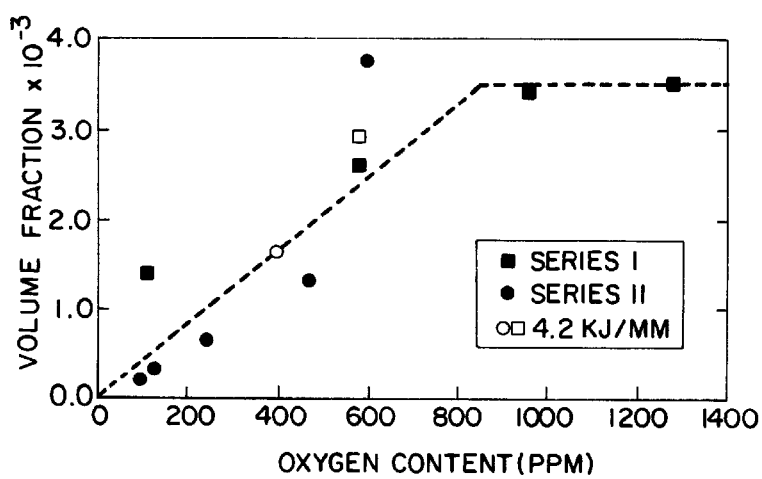
FIG. 2 is a plotted graph which demonstrates the relationship between inclusion volume fraction and weld metal oxygen content.

A plot of the inclusion volume fraction versus the weld metal oxygen content is shown in FIG. 2. Within the considerably scattered data, the inclusion volume fraction appears to be proportional to the oxygen content up to approximately 0.08 wt. % oxygen. Above that level the inclusion volume fraction is seen to be independent of the oxygen content.

The arithmetic mean three-dimensional (3-D) particle diameters, $d_v$, provided in Table 4, were calculated from the measured two-dimensional (2-D) particle diameters, $d_a$, using the Fullman equation:

$$d_v = \pi/2 \, d_a.$$

See Fullman, *AIME*, 197 (1953), p. 447.

Figure 3:
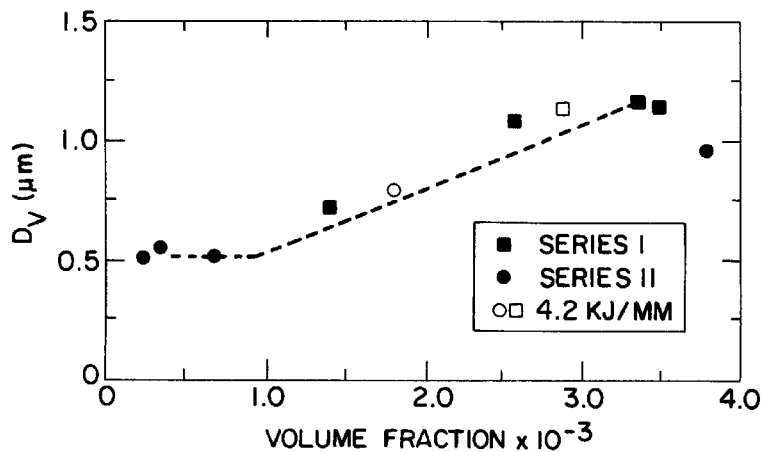
FIG. 3 is a plotted graph which demonstrates the relationship between mean three-dimensional (3-D) particle diameter and inclusion volume fraction.

The plot in FIG. 3 shows that the arithmetic mean 3-D inclusion diameter is independent of the inclusion volume fraction up to a value of about $1 \times 10^{-3}$. A further increase in the volume fraction is accompanied by a coarsening of the inclusions.

Figure 4A:
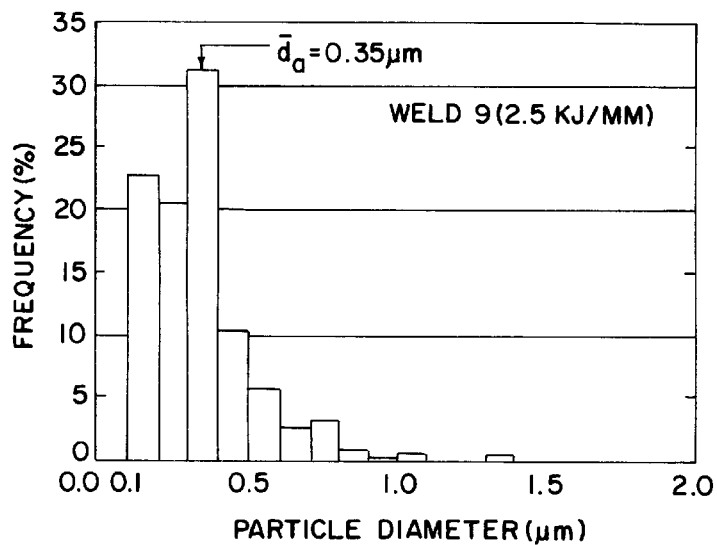
FIG. 4(a) illustrates the effect of heat input on the two-dimensional (2-D) inclusion size distribution for weld no. 9.
Figure 4B:
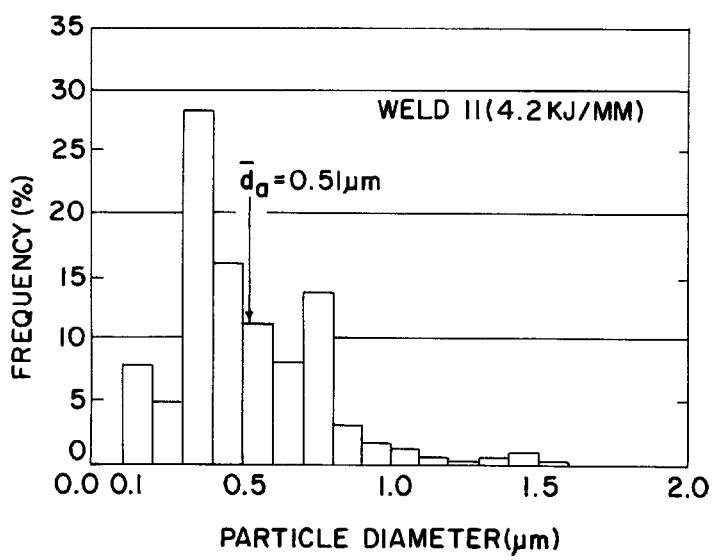
FIG. 4(b) illustrates the effect of heat input on the two-dimensional (2-D) inclusion size distribution for weld no. 11.

Examples of measured inclusion histograms are presented in FIGS. 4(*a*) and 4(*b*). As shown by the two plots, size distribution of the inclusion is strongly affected by an increase in the heat input. At 2.5 kJ/mm, the arithmetic mean 2-D inclusion diameter is equal to 0.35 μm while an increase in the heat input to 4.2 kJ/mm gives rise to a 45% increase in the mean particle diameter, to 0.51 μm.

Considering the austenite grain size, an increase in the heat input had no significant effect. For all welds in the present example, the grain size was found to be about 500 μm.

Since most of the inclusions were found to be either spherical or angular in shape, important inclusion characteristics such as (a) the number of particles per unit volume, $N_v$, (b) the number of particles per unit area, $N_a$, and (c) the mean particle spacing, $\lambda_v$, can be calculated from the basic stereometric relationships:

$$N_v = \frac{6V_v}{\pi (d_v)^3},$$

$$N_a = N_v d_n,$$

and $$\lambda_v = 0.554 \, (1/N_v)^{1/3}.$$

See Ashby et al., *TMS-AIME*, 236 (1966), p. 1396; Underwood, *Quantitative Stereology*, (Addison-Wesley, London, 1970), p. 109.

TABLE 4

| Series | Weld | $V_v \times 10^3$ | $d_a$(μm) | $d_v$(μm) | $N_v \times 10^6$ (No/mm$^3$) | $N_a \times 10^3$ (No/mm$^2$) | $\lambda_v$(μm) |
|---|---|---|---|---|---|---|---|
| I | 1 | 1.4 | 0.46 | 0.72 | 7.16 | 5.16 | 2.9 |
| | 2 | 2.6 | 0.68 | 1.07 | 4.05 | 4.33 | 3.5 |
| | 3 | 3.5 | 0.72 | 1.13 | 5.63 | 5.23 | 3.3 |
| | 4 | 3.4 | 0.73 | 1.15 | 4.27 | 4.91 | 3.4 |
| | 5 | 2.9 | 0.71 | 1.12 | 3.94 | 4.41 | 3.5 |
| II | 6 | 0.25 | 0.33 | 0.52 | 3.40 | 1.77 | 3.7 |
| | 7 | 0.35 | 0.35 | 0.55 | 4.02 | 2.21 | 3.5 |
| | 8 | 0.68 | 0.33 | 0.52 | 9.24 | 4.80 | 2.6 |
| | 9 | 1.34 | 0.35 | 0.55 | 15.38 | 8.46 | 2.2 |
| | 10 | 3.77 | 1.61 | 0.96 | 8.14 | 7.81 | 2.8 |
| | 11 | 1.84 | 0.51 | 0.80 | 6.86 | 5.49 | 2.9 |

Note: The abbreviations used in Table 4 are as follows: Inclusion volume fraction ($V_v$), arithmetic means two-dimensional particle diameter ($d_a$), arithmetic means three-dimensional particle diameter ($d_v$), number of particles per unit volume ($N_v$), number of particles per unit area ($N_a$), and mean particle center-to-center volume spacing ($\lambda_v$).

Calculated values for $N_v$, $N_a$, and $\lambda_v$, are presented in Table 4. A closer inspection of these data reveals that the inclusion density varies from $3.4 \times 10^6$ to $15.38 \times 10^6$ particles/mm³, which is equivalent to a mean center-to-center inclusion volume spacing of 3.7 to 2.2 μm.

Although no attempts were made to fully characterize the non-metallic inclusions regarding chemical composition, qualitative microanalysis was used to determine the chemistry of a selected number of particles. The results from those analyses revealed a shift in the inclusion chemical composition from spherical manganese silicates to predominantly angular chromium oxides with increasing weld-metal oxygen content. This was particularly true for welds within Series I. The observed shift in the chemical composition of inclusions is most likely due to the low manganese content of the filler wire used in this series.

The results of the tensile testing are summarized in Table 5. The data reveal an offset yield strength, $R_{p0.2}$, within a range of 870 MPa to 995 MPa, and an ultimate tensile strength, $R_m$, ranging from 1075 MPa to 1337 MPa. In addition, a minimum value of 21% has been obtained for elongation at fracture and 17% for reduction of area. An exception to this is weld 3. However, the low values experienced for this weld were due to a weld defect.

Figure 8:
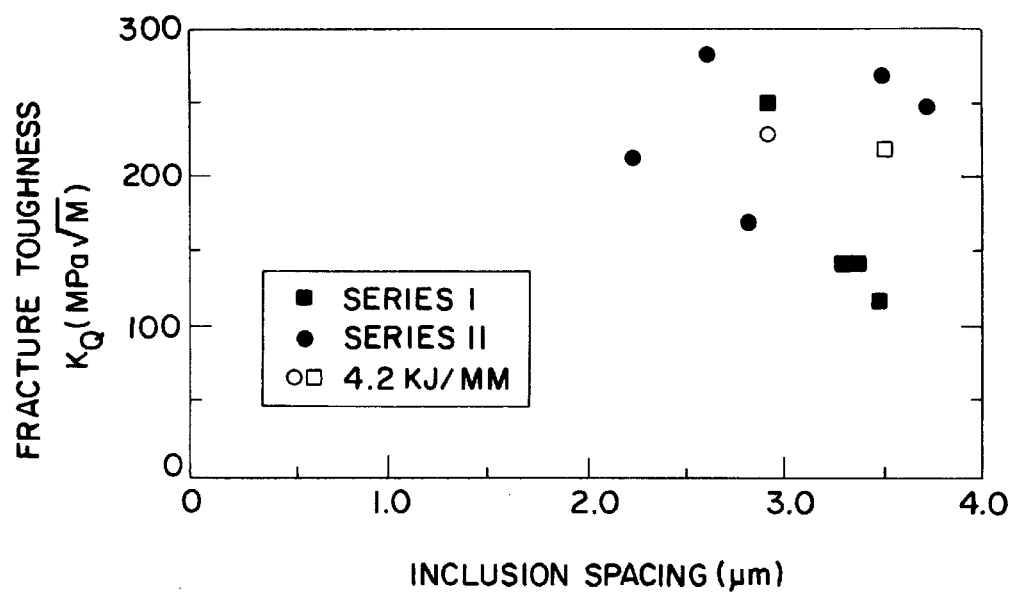
FIG. 8 illustrates the effect of mean center-to-center inclusion volume spacing on weld metal fracture toughness.

6 and 7, respectively. Although there is some scatter in the data, the energy required for crack initiation and crack propagation are seen to decrease as the inclusion volume fraction increases. Also, the high heat input welds exhibit somewhat better fracture properties compared to their low heat input counterparts. As Table 4 demonstrates, the mean particle center-to-center volume spacing on the former welds is slightly larger that the latter, and this may explain the better fracture properties. However, the plot shown in FIG. 8 suggests that the inclusion spacing is not a good overall fracture parameter under the prevailing circumstances.

The fractographic examinations indicated that all the welds failed in a ductile manner, with fracture surfaces exhibiting typical ductile dimple morphologies. It was also evident from those fractographs that the dimple size increased with increasing particle diameter.

All of the references cited herein, including publications, standards, patents, and the like, are hereby incorporated in their entireties by reference.

While this invention has been described with an emphasis upon a preferred embodiment, it will be obvious to those of

TABLE 5

| Series | Weld | Yield Strength $R_{p0.2}$ (MPa) | Tensile Strength $R_m$ (MPa) | Elongation at Fracture (%) | Reduct. of Area (%) | Fracture Tough. $K_Q$ (MPa√m) | Tearing Modulus |
|---|---|---|---|---|---|---|---|
| I | 1 | 969 | 1236 | 21 | 27 | 251 | 79 |
|   | 2 | 938 | 1310 | 30 | 24 | 116 | 19 |
|   | 3 | 970 | 1075 | 7 | 6 | 139 | 21 |
|   | 4 | 921 | 1250 | 34 | 28 | 139 | 15 |
|   | 5 | 870 | 1159 | 29 | 17 | 224 | 40 |
| II | 6 | 937 | 1301 | 49 | 39 | 250 | 39 |
|   | 7 | 995 | 1337 | 49 | 42 | 272 | 40 |
|   | 8 | 973 | 1222 | 26 | 24 | 286 | 29 |
|   | 9 | 940 | 1271 | 39 | 27 | 218 | 44 |
|   | 10 | 912 | 1275 | 42 | 39 | 170 | 16 |
|   | 11 | 964 | 1283 | 39 | 30 | 231 | 33 |

The results of J-testing are also provided in Table 5.

The yield strength, tensile strength, elongation as fracture, and reduction of area were all determined using ASTM Standard E-8. Fracture toughness was determined using ASTM Standard E-813. Crack-growth fracture toughness is evaluated by a dimensionless tearing modulus (T) where:

$$T = \frac{E}{\sigma_y^2} \frac{dJ}{d(\Delta a)}$$

wherein dJ/d(Δa) is the average slope of the stable crack extension portion of the J vs. Δa plot constructed in accordance with ASTM Standard E 813. See Ashby, p. 1396.

For Series I, the fracture toughness falls within a range of 116 MPa√m to 251 MPa√m with a dimensionless tearing modulus ranging from 19 to 79. The welds within Series II, on the other hand, exhibited a higher fracture toughness, ranging from 170 MPa√m to 286 MPa√m, and a tearing modulus within a range of 16 to 44. Without desiring to be bound to any particular theory, the lower fracture toughness of the welds within Series I may be attributed to the observed shift in the inclusion morphology with increasing weld metal oxygen content. Angular inclusions give rise to higher stress concentration than spherical inclusions.

Figure 5:
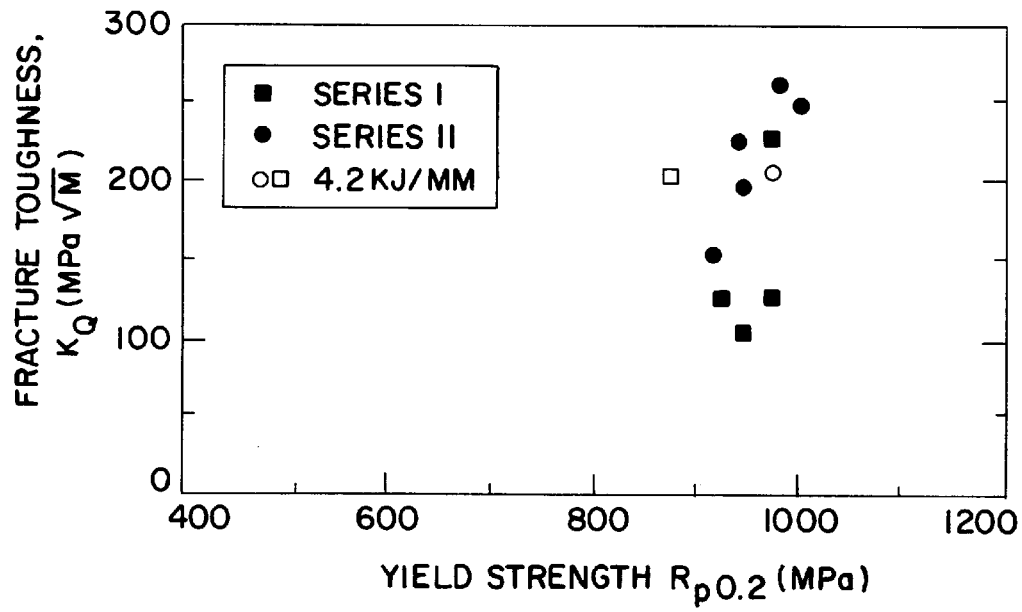
FIG. 5 illustrates the effect of yield strength on weld metal fracture toughness.
Figure 6:
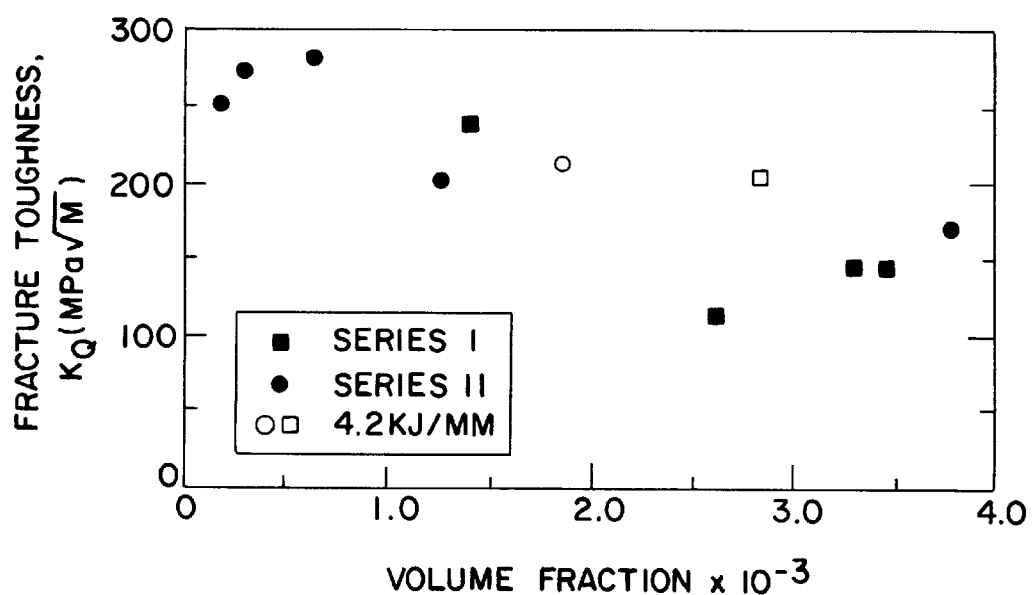
FIG. 6 illustrates the effect of inclusion volume fraction on weld metal fracture toughness.
Figure 7:
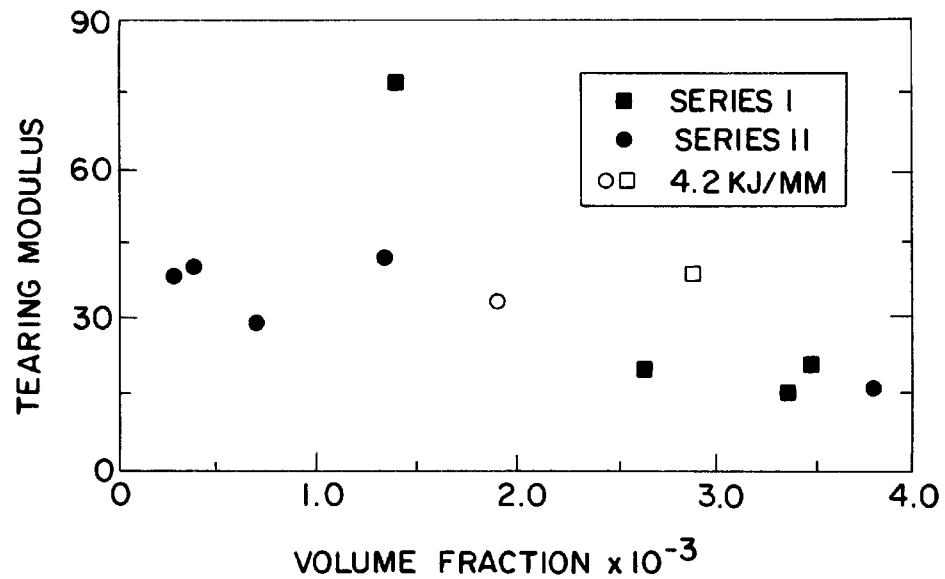
FIG. 7 illustrates the effect of inclusion volume fraction on weld metal tearing modulus.

FIG. 5 is a plot of the fracture toughness versus the weld metal yield strength. As evidenced by the plot, the observed range in yield strength is not responsible for the recorded variations in the fracture toughness.

Plots of the fracture toughness and the tearing modulus versus the inclusion volume fraction are provided in FIGS.

ordinary skill in the art that variations of the preferred products and methods may be used and that it is intended that the invention may be practiced otherwise than as specifically described herein. Accordingly, this invention includes all modifications encompassed within the spirit and scope of the invention as defined by the following claims.

What is claimed is:

1. A method for welding a metal part comprising welding the metal part using a welding electrode to provide a weld metal, the welding electrode comprising an austenitic steel alloy comprising nickel at a concentration ranging from about 12 wt. % to about 20 wt. %, manganese at a concentration ranging from about 3 wt. % to about 7 wt. %, nitrogen at a concentration ranging from about 0.15 wt. % to about 0.2 wt. %, chromium at a concentration ranging from about 15 wt. % to about 25 wt. %, molybdenum at a concentration ranging from about 3 wt. % to about 10 wt. %, copper, and iron, wherein the nickel, nitrogen, chromium, and molybdenum are present in effective amounts such that the alloy is austenitic, wherein the total oxygen content in the weld metal is less than about 0.06 wt. %.

2. The method according to claim 1, wherein the metal is welded using gas metal arc welding, and wherein at least one shielding gas is used during the welding which contains no more than about 2 vol. % oxygen.

3. The method according to claim 2, wherein the at least one shielding gas comprises a plurality of shielding gases in a concentric arrangement of shielding gas layers.

4. The method for welding a metal part according to claim 1, wherein in the welding electrode, nickel is present at a concentration of about 20 wt. %, manganese is present at a concentration of about 7 wt. %, nitrogen is present at a concentration of about 0.19 wt. %, chromium is present at a concentration of about 20 wt. %, molybdenum is present at a concentration of about 5 wt. %, and copper is present at a concentration of about 1.6 wt. %.

5. A method for welding a metal part comprising welding the metal part using a welding electrode to provide a weld metal, the welding electrode comprising an austenitic steel alloy comprising nickel at a concentration ranging from about 20 wt. % to about 30 wt. %, manganese at a concentration ranging from about 5 wt. % to about 10 wt. %, nitrogen at a concentration ranging from about 0.15 wt. % to about 0.2 wt. %, chromium at a concentration ranging from about 12 wt. % to about 19.4 wt. %, molybdenum at a concentration of about 3 wt. %, copper, and iron, wherein the nickel, nitrogen, chromium, and molybdenum are present in effective amounts such that the alloy is austenitic, wherein the total oxygen content in the weld metal is less than about 0.06 wt. %.

6. The method according to claim 5, wherein the metal is welded using gas metal arc welding, and wherein at least one shielding gas is used during the welding which contains no more than about 2 vol. % oxygen.

7. The method according to claim 6, wherein the at least one shielding gas comprises a plurality of shielding gases in a concentric arrangement of shielding gas layers.

8. A method for welding a metal part comprising welding the metal part using a welding electrode comprising an austenitic alloy comprising chromium, nickel and iron in effective amounts such that the alloy is austenitic in gas metal arc welding, wherein at least one shielding gas is used during the welding which contains no more than 0.5 vol. % oxygen.

9. The method of claim 7, wherein the welding electrode comprises an austenitic steel alloy comprising nickel at a concentration ranging from about 12 wt. % to about 20 wt. %, manganese at a concentration ranging from about 3 wt. % to about 7 wt. %, nitrogen at a concentration ranging from about 0.15 wt. % to about 0.2 wt. %, chromium at a concentration ranging from about 15 wt. % to about 25 wt. %, molybdenum at a concentration ranging from about 3 wt. % to about 10 wt. %, copper, and iron, wherein the nickel, nitrogen, chromium, and molybdenum are present in effective amounts such that the alloy is austenitic.

10. The method for welding a metal part according to claim 9, wherein in the welding electrode, nickel is present at a concentration of about 20 wt. %, manganese is present at a concentration of about 7 wt. %, nitrogen is present at a concentration of about 0.19 wt. %, chromium is present at a concentration of about 20 wt. %, molybdenum is present at a concentration of about 5 wt. %, and copper is present at a concentration of about 1.6 wt. %.

11. The method of claim 8, wherein the welding electrode comprises an austenitic steel alloy comprising nickel at a concentration ranging from about 20 wt. % to about 30 wt. %, manganese at a concentration ranging from about 5 wt. % to about 10 wt. %, nitrogen at a concentration ranging from about 0.15 wt. % to about 0.2 wt. %, chromium at a concentration ranging from about 12 wt. % to about 19.4 wt. %, molybdenum at a concentration of about 3 wt. %, copper, and iron, wherein the nickel, nitrogen, chromium, and molybdenum are present in effective amounts such that the alloy is austenitic.

12. The method according to claim 8, wherein the at least one shielding gas comprises a plurality of shielding gases in a concentric arrangement of shielding gas layers.

13. A method for welding a metal part comprising welding the metal part using gas metal arc welding and a welding electrode comprising an austenitic alloy comprising chromium, nickel and iron to provide a weld metal which comprises oxygen, wherein at least one shielding gas is used during gas metal arc welding, and wherein the at least one shielding gas is selected so that the total oxygen content in the weld metal is less than about 0.06 wt. %.

14. The method according to claim 13, wherein the at least one shielding gas comprises a plurality of shielding gases in a concentric arrangement of shielding gas layers.

15. The method of claim 13, wherein the welding electrode comprises an austenitic steel alloy comprising nickel at a concentration ranging from about 12 wt. % to about 20 wt. %, manganese at a concentration ranging from about 3 wt. % to about 7 wt. %, nitrogen at a concentration ranging from about 0.15 wt. % to about 0.2 wt. %, chromium at a concentration ranging from about 15 wt. % to about 25 wt. %, molybdenum at a concentration ranging from about 3 wt. % to about 10 wt. %, copper, and iron, wherein the nickel, nitrogen, chromium, and molybdenum are present in effective amounts such that the alloy is austenitic.

16. The method for welding a metal part according to claim 15, wherein in the welding electrode, nickel is present at a concentration of about 20 wt. %, manganese is present at a concentration of about 7 wt. %, nitrogen is present at a concentration of about 0.19 wt. %, chromium is present at a concentration of about 20 wt. %, molybdenum is present at a concentration of about 5 wt. %, and copper is present at a concentration of about 1.6 wt. %.

17. The method according to claim 13, wherein the at least one shielding gas is selected so that the total oxygen content in the weld metal is less than about 0.04 wt. %.

18. The method of claim 13, wherein the welding electrode comprises an austenitic steel alloy comprising nickel at a concentration ranging from about 20 wt. % to about 30 wt. %, manganese at a concentration ranging from about 5 wt. % to about 10 wt. %, nitrogen at a concentration ranging from about 0.15 wt. % to about 0.2 wt. %, chromium at a concentration ranging from about 12 wt. % to about 19.4 wt. %, molybdenum at a concentration of about 3 wt. %, copper, and iron, wherein the nickel, nitrogen, chromium, and molybdenum are present in effective amounts such that the alloy is austenitic.

19. The method according to claim 18, wherein the at least one shielding gas is selected so that the total oxygen content in the weld metal is less than about 0.04 wt. %.

20. A method for welding a metal part comprising welding the metal part using a welding electrode comprising an austenitic alloy comprising nickel, manganese, nitrogen, chromium, molybdenum, and iron, wherein the nickel, manganese, nitrogen, and chromium are present in effective amounts such that the alloy is austenitic, and wherein the total oxygen content in the weld metal is less than 0.06 wt. %.

21. The method according to claim 20, wherein the welding is gas metal arc welding.

* * * * *